(12) United States Patent
Snawerdt

(10) Patent No.: US 7,099,592 B2
(45) Date of Patent: Aug. 29, 2006

(54) TELECOMMUNICATIONS CARD FOR SECURE OPTICAL DATA TRANSMISSION AND INSTALLATION METHOD

(75) Inventor: Peter Snawerdt, Melbourne Beach, FL (US)

(73) Assignee: Oyster Optics, Inc., New York, NY (US)

( * ) Notice: Subject to any disclaimer, the term of this patent is extended or adjusted under 35 U.S.C. 154(b) by 876 days.

(21) Appl. No.: 09/776,438

(22) Filed: Feb. 2, 2001

(65) Prior Publication Data

US 2002/0105702 A1    Aug. 8, 2002

(51) Int. Cl.
*H04B 10/12* (2006.01)
(52) U.S. Cl. ............. 398/141; 398/161; 398/163; 398/164; 398/102; 398/135; 398/136; 398/138; 398/139; 398/182; 398/183; 398/185; 398/186; 398/188; 398/202; 398/214
(58) Field of Classification Search .......... 398/141, 398/161, 164, 188, 182, 135, 102, 163, 136, 398/138, 139, 202, 214, 185, 186, 183
See application file for complete search history.

(56) References Cited

U.S. PATENT DOCUMENTS

| | | | |
|---|---|---|---|
| 4,754,452 A | 6/1988 | Henry ..................... 370/85 |
| 4,998,295 A * | 3/1991 | Siegel .................... 398/212 |
| 5,223,967 A | 6/1993 | Udd ....................... 359/119 |
| 5,239,306 A | 8/1993 | Siwiak et al. ........ 340/825.44 |
| 5,291,516 A | 3/1994 | Dixon et al. ............... 375/1 |
| 5,452,086 A * | 9/1995 | Bunn ..................... 356/477 |
| 5,455,698 A | 10/1995 | Udd ....................... 359/119 |
| 5,543,952 A | 8/1996 | Yonenaga et al. ........ 359/181 |
| 5,572,350 A * | 11/1996 | Spanke .................... 398/54 |
| 5,606,446 A | 2/1997 | Davis et al. ............. 359/173 |
| 5,726,784 A | 3/1998 | Alexander et al. ........ 359/125 |
| 5,793,512 A | 8/1998 | Ryu ....................... 359/179 |
| 5,825,949 A * | 10/1998 | Choy et al. ............... 385/24 |
| 5,896,211 A | 4/1999 | Watanabe ................ 359/124 |
| 5,920,416 A | 7/1999 | Beylat et al. ............ 359/181 |
| 5,923,451 A * | 7/1999 | Karstensen et al. ...... 398/164 |
| 5,940,452 A | 8/1999 | Rich ...................... 375/347 |
| 5,946,119 A | 8/1999 | Bergano et al. .......... 359/124 |
| RE36,430 E | 12/1999 | Halbert-Lassalle et al. . 370/204 |
| 6,072,615 A | 6/2000 | Mamyshev ............... 359/183 |
| 6,097,525 A | 8/2000 | Ono et al. ............... 359/181 |
| 6,201,632 B1 * | 3/2001 | Rollins ................... 359/259 |
| 6,243,505 B1 | 6/2001 | Bosso et al. ............... 385/2 |
| 6,256,130 B1 | 7/2001 | Bülow .................... 359/173 |
| 6,271,950 B1 * | 8/2001 | Hansen et al. ........... 398/154 |
| 6,285,548 B1 | 9/2001 | Hamlet et al. ........... 361/695 |
| 6,335,814 B1 * | 1/2002 | Fuse et al. ............... 398/201 |
| 6,362,908 B1 * | 3/2002 | Kimbrough et al. ...... 398/164 |

(Continued)

OTHER PUBLICATIONS

Newbridge 3600 MainStreet Family Preinstallation Guide section 10.3 et seq., Mar. 1998.

(Continued)

*Primary Examiner*—Hanh Phan
(74) *Attorney, Agent, or Firm*—Davidson, Davidson & Kappel, LLC

(57) ABSTRACT

A card for transmitting data over at least one optical fiber includes a transmitter having at least one light source and a phase modulator for phase modulating light from the source so as to create phase-modulated optical signals in the light as a function of an input electronic data stream; and a receiver having an interferometer for reading received optical signals.

19 Claims, 2 Drawing Sheets

U.S. PATENT DOCUMENTS 6,459,517 B1 * 10/2002 Duncan et al. ............. 398/135
6,469,816 B1 * 10/2002 Snawerdt ................... 398/188
6,476,952 B1 * 11/2002 Snawerdt ................... 398/141
6,549,311 B1 *  4/2003 Hakki et al. ..................... 1/1
6,594,055 B1 *  7/2003 Snawerdt ................... 398/141
6,643,046 B1 * 11/2003 Ibe et al. ................... 359/238
6,665,500 B1 * 12/2003 Snawerdt ................... 398/185

OTHER PUBLICATIONS

STM/S Release 4.0 Documentation, printed from Internet Jan. 17, 2001, date unknown.

* cited by examiner

TELECOMMUNICATIONS CARD FOR SECURE OPTICAL DATA TRANSMISSION AND INSTALLATION METHOD

BACKGROUND OF THE INVENTION

1. Field of the Invention

The present invention relates generally to telecommunications and more particularly to transmitters and receivers for fiber optic networks.

2. Background Information

In current fiber optic networks, an electronic data stream is fed to an optical fiber multiplexor, which is also called "a box" in the industry. Each multiplexor runs on a specific transmission standard, for example, SONET. A laser and an amplitude modulation circuit for the laser typically are located on a card, which fits into the box. The laser amplitude modulator typically pulses or alters the laser output to create an amplitude-modulated optical signal representative of the electronic data stream. The laser amplitude modulator and laser thus define a transmitter for transmitting the optical signal over an optical fiber. A receiver for the amplitude-modulated optical signals of the optical data typically includes a photodiode to convert the optical signals back into the electronic data stream. Both the transmitter and the receiver typically are located on the backplane of a single card, which is replaceable should a component fail.

The card typically also contains a connector for receiving at least one optical fiber, for example a duplex SC connector. The connectors normally are located on a faceplate of the card, the faceplate being perpendicular to the backplane.

The reading of the amplitude-modulated optical data signals using the photodiode on the card is straightforward: the optical signals either produce an electric output at the photodiode or they do not. As a result, an output electronic data stream of zeros and ones is generated.

The electronics for the amplitude modulation of the laser and for the receiving of the optical data on the card thus is relatively simple. All that is required is a pulsing circuit for pulsing the laser as a direct function of the input data and a photodiode for the receiver.

Existing amplitude modulated systems have the disadvantage that the fiber can be easily tapped and are not secure.

U.S. Pat. No. 5,455,698 purports to disclose a secure fiber optic communications system based on the principles of a Sagnac interferometer. A data transmitter is a phase modulator for modulating counter-propagating light beams sent by a receiver round a loop. The receiver includes a light source, a beamsplitter for splitting light from the light source into counter-propagating light beams and for receiving the phase-modulated light beams, and an output detector. U.S. Pat. No. 5,223,967 describes a similar Sagnac-interferometer-based system operating over a single optical fiber.

The Sagnac-interferometer-based systems described in these patents have the disadvantage that they require the light to travel over a loop, whether back and forth in a single fiber or over a long length looped fiber. As a result, either the link budget for the single fiber must be doubled, reducing the data carrying capacity for a single fiber, or else a looped fiber with significant and expensive extra length of at least twice that of a single fiber must be laid between the transmitter and the receiver. Moreover, the receiver contains the light source, as opposed to the current installed base where the transmitter has the light source.

The Sagnac-interferometer-based systems thus are expensive to build and operate, and do not work particularly well with existing multiplexors or card formats.

U.S. Pat. No. 6,072,615 purports to describe a method for generating a return-to-zero optical pulses using a phase modulator and optical filter. The RZ-pulse optical signal transmitted over the fiber is easily readable by a detector. No card is disclosed. The return-to-zero signals also are read by a photodiode.

U.S. Pat. No. 5,606,446 purports to describe an optical telecommunications system employing multiple phase-compensated optical signals. Multiple interferometric systems are combined for the purpose of multiplexing various payloads on the same optical transmission path. The patent attempts to describe a method for providing fiber usage diversity using optical coherence length properties and a complex transmit/receive system. Each transmitter has a splitter, a plurality of fibers and a plurality of phase modulators to create the multiplexed signal, which is then demultiplexed at the receiver. This system is complex and expensive. Moreover, the interferometers disclosed are not part of a card-based system, as the patent only mentions that the tributary cards for producing electrical signals are card-based, as disclosed at column 14, lines 52 et seq. The system of the '446 patent is thus difficult to implement with existing commercial boxes.

SUMMARY OF THE PRESENT INVENTION

An object of the present invention is to provide a card for providing secure optical data transmission over optical fiber. Another alternate or additional object of the present invention is to provide for replacement of existing amplitude-modulated-based cards with phase-modulated-based cards.

The present invention provides a card for transmitting data over at least one optical fiber, the card having a transmitter and a receiver, the transmitter having at least one light source and a phase modulator for phase modulating light from the source so as to create phase-modulated optical signals in the light as a function of an input electronic data stream, the receiver having an interferometer for reading received optical signals.

The present invention thus permits a card-based phase-modulated transmission system, which can provide for more secure data transmission than existing amplitude-based cards. Because of the simplified light source/phase-modulator structure of the transmitter and the interferometer structure of the receiver of the present card, the parts can fit all on one card compatible with most existing box dimensions.

Preferably, the transmitter and the receiver of the card are similar to that described in co-owned U.S. Pat. No. 6,594,055 entitled "Secure Fiber Optics Telecommunications System and Method" and filed on Jan. 17, 2001, the entire disclosure of which is hereby incorporated by reference herein, or similar to that described in co-owned U.S. Pat. No. 6,665,500 entitled "Dual-Mode Fiber Optics Telecommunications System and Method" and filed on Jan. 29, 2001, the entire disclosure of which is hereby incorporated by reference herein.

The light source preferably is a laser, for example a semiconductor laser operating at a 1550 nm, or other, wavelength.

Preferably, an energy level detector is also provided on the card for measuring light energy in a fiber. Because the transmitter is typically transmitting in secure mode using a continuous wave laser, the energy level read by the detector should be constant. When a drop in the energy level is detected, which may indicate a tap, the card may provide an alarm signal, for example a light on the outside of the box or a sound-emitting alarm.

Preferably, the interferometer includes a delay loop fiber, which may be retained on the card by a fastening device so as not to be loose. For example, the fiber may be looped around spindles or the card itself in any variety of manners to fasten the fiber and obtain a desired delay.

Preferably, the card includes a delayed feedback exclusive-or gate, with the delay matched to the fiber loop delay. The exclusive-or gate can be part of the transmitter or the receiver of the card.

The interferometer located on the card includes a splitter and a coupler.

The card includes an optical fiber interface for at least one fiber, and preferably for two fibers. The interface may be a duplex SC connector, for example.

The card preferably is a replacement part for an existing optical multiplexor.

The present invention also provides a method for converting an existing amplitude-based optical device to a phase-modulated based optical device comprising the steps of:

removing a card having an amplitude-modulated light source from an existing optical telecommunications device; and inserting a new card having a phase-modulated light source and an interferometer into the existing telecommunications device.

The present invention also provides a method for manufacturing a card for transmitting data over at least one data transmitting optical fiber, the card having a transmitter and a receiver, the method comprising the steps of:

placing at least one light source on a printed circuit board, placing a phase modulator onto the printed circuit board next to the at least one light source, the phase modulator being connected to the at least one light source, but not by the at least one data transmitting optical fiber; and placing an interferometer on the printed circuit board.

Preferably, a splitter and an energy level detector are also placed on the printed circuit board, and a light emitting diode (LED) or other light emitting device is connected to a faceplate connected to the printed circuit board. The LED indicates a change in energy at the detector.

BRIEF DESCRIPTION OF THE DRAWINGS

A preferred embodiment of the present invention is described below by reference to the following drawings, in which.

DETAILED DESCRIPTION

Figure 1:
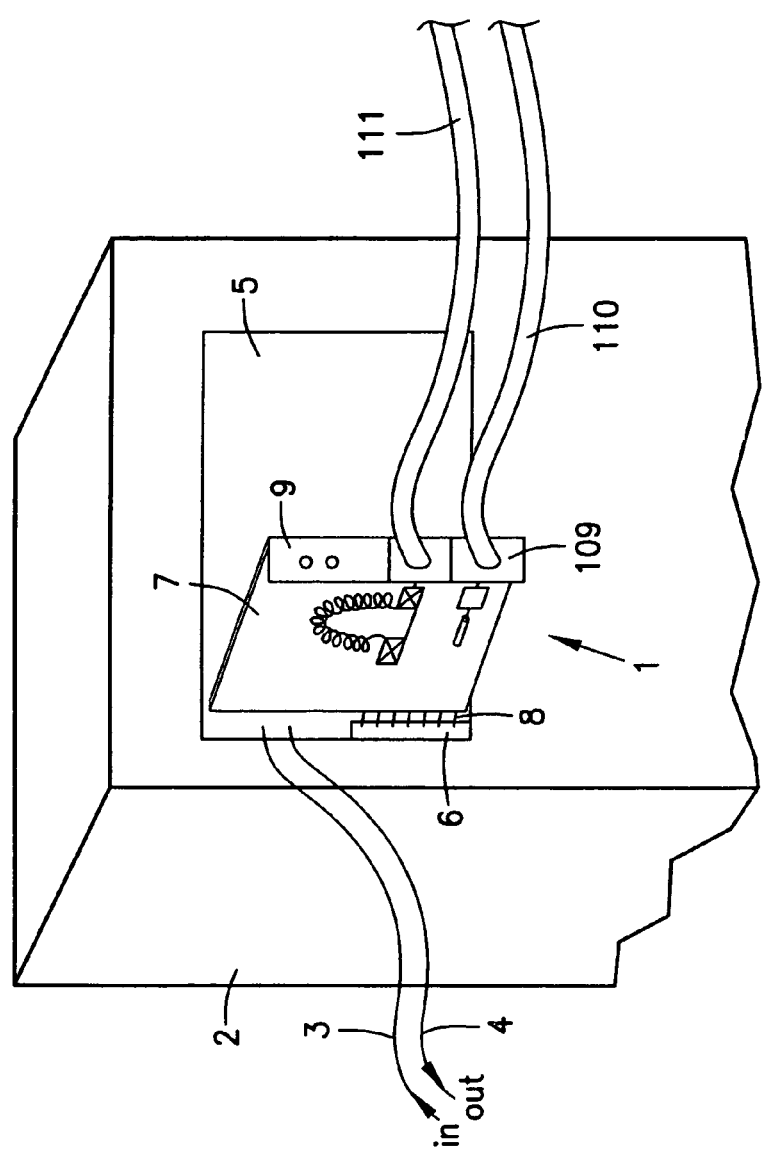
FIG. 1 shows schematically a card of the present invention located in an existing telecommunications box, such as a mutliplexor.

FIG. 1 shows an existing telecommunications box 2, for example a multiplexor, refitted with a card 1 of the present invention. Box 2 has an electronic data input 3 and output 4, which connect to a motherboard 5 of the box 2. Motherboard 5 includes a bus 6 for connecting existing amplitude-based cards to the motherboard 5, and connects the input 3 and output 4, through for example, data conversion circuitry, to the bus 6. The type of bus 6 is dependent upon the box manufacturer, and different types of boxes, motherboards and buses are well known in the art. Card 1 of the present invention includes electrical connections 8 to fit into bus 6.

Card 1 also includes a faceplate 9 and a backplane 7, which preferably is a printed circuit board. Faceplate 9 may be perpendicular to backplane 7 and be flush with a front side of box 2.

Faceplate 9 may have a fiber connector 109, such as a duplex SC connector, for connecting to an output fiber 110 and an input fiber 111. Alternately, a single fiber for inputting and outputting signals could be provided.

Figure 2:
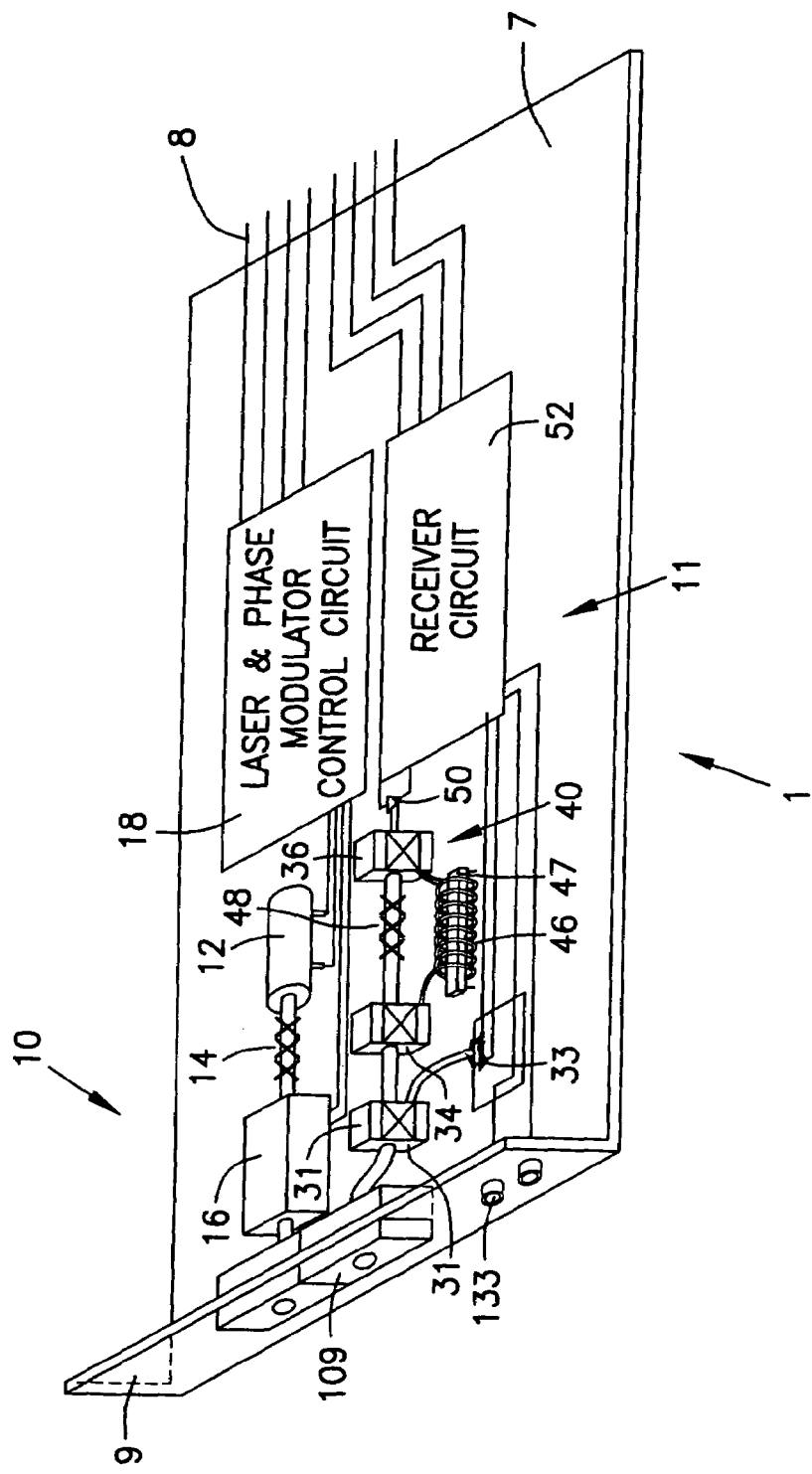
FIG. 2 shows details a packet for possible use with the transmitter of the present invention.

FIG. 2 shows the card 1 of the present invention in more detail. A transmitter 10 transmits signals over optical fiber 110 (FIG. 1). Transmitter 10 includes a single laser 12, for example a semiconductor laser emitting a narrow band of light at approximately 1550 nm, or at other wavelengths. Light emitted from laser 12 passes through a phase modulator 16, for example a Mach-Zender phase modulator, directly next to or part of the same package as laser 12. The light may be depolarized by a depolarizer 14. An electronic controller 18, preferably manufactured directed on the printed circuit board of backplane 7, controls phase modulator 16 and may provide power to laser 12, which operates at a constant amplitude during a secure mode. The controller 18 preferably includes a delayed-feedback exclusive-or gate and is simmer to the controller disclosed in incorporated-by-reference U.S. Pat. No. 6,594,055 entitled "Secure Fiber Optics Telecommunications System and Method" and filed on Jan. 17, 2001.

Input data through connections 8 is fed to the controller 18, which then controls phase modulator 16 to phase modulate the constant amplitude light from laser 12 as a function of the input data.

Receiver 11 includes an interferometer 40 for reading phase-modulated signals and may be similar to that disclosed in incorporated-by-reference U.S. Pat. No. 6,594,055 entitled "Secure Fiber Optics Telecommunications System and Method" and filed on Jan. 17, 2001.

Optical signals are received at connector 109 from fiber 111 (FIG. 1).

Receiver 11 includes a coupler/splitter 31, functioning as a splitter. Splitter 31 splits off a portion of the light, directing part of the optical energy to an energy level or tap detector 33 and passes the remaining light to a second coupler/splitter 32.

Interferometer 40 receives the rest of the light from splitter 31. The interferometer 40 has a coupler/splitter 34, functioning as a splitter, and a coupler/splitter 36, functioning as a coupler.

Detector 33 monitors the light energy in the fiber 111 via the light energy coupled to the detector by splitter 31. If the amplitude drops during this mode, most likely from a tap, the detector 33 provides an alert and can, for example, sound an alarm or alert network maintenance personnel, for example through an LED 133. Another LED 134 can provide an indication of proper signal reception.

Optical signals, after passing splitter 31, enter interferometer 40 at an input of splitter 34. Splitter 34 splits the light, so that the signals may travel over both a first path and a second path. A depolarizer 48 may depolarize light passing through thr first path, for example. The second path may includes a delay fiber 46 which may include a fiber loop of a desired length. Delay fiber 46 then provides an input to coupler 36, which recombines the delayed signal with the non-delayed signal propagating through the first path and depolarizer 48 at an output. The physical delay imposed by the interferometer 40 in the second light path, with its delay loop 46, with respect to light passing through the first light path and depolarizer 48 is selected to match as closely as possible any electronic delay time imposed by an electronic delay circuit. However, a delay, while preferable, is not necessary.

The phase-modulated signals 22 recombining at coupler 36 thus permit the signals to be read by a photodiode 50. The signals of the photodiode 50 pass through a receiver circuit 52, which preferably filters the signals so as to provide an output signal at connections 8 with a low bit rate error.

The interferometer 40 preferably has the delay loop 46, which may be a long section of optical fiber for example 3 feet long. The loop may be coiled depending upon its bending capability, and retained in the coil with a fastening device such as spindle 47, which may for example be made of plastic. Loop 46 also may extend around the perimeter of card 1, so as to gain greater length, but is preferably retained with a fastening device such as clips or in some similar fashion.

The component sizes and types will depend upon the type of transmission desired. For example OC-3 cards may vary in size and certain component types from OC-192 cards.

While the cards may be placed in new boxes, the present invention also permits for the removal of existing amplitude-modulated-based cards to be easily replaced by the phase-modulated-based cards. The fibers are disconnected, the box 2 is simply opened and the amplitude-modulated-based card is removed. The card 1 is inserted into the bus 6 and the fibers are connected.

With a card having the dual-mode system described in incorporated-by-reference U.S. Pat. No. 6,665,500 entitled "Dual-Mode Fiber Optics Telecommunications System and Method" and filed on Jan. 29, 2001, the card 1 thus may also include a switch for an operator to set the transmission mode.

The card 1 of the present invention may thus provide existing boxes with a secure transmission mode capability.

What is claimed is:

1. A card for transmitting data over at least one optical fiber, the card comprising:
   a transmitter having at least one light source and a phase modulator for phase modulating light from the source so as to create phase-modulated optical signals in the light as a function of an input electronic data stream; and
   a receiver having an interferometer for reading received optical signals, the interferometer having a delay loop fiber; and
   a fastening device for securing the delay loop fiber.

2. The card as recited in claim 1 wherein the at least one light is a laser.

3. The card as recited in claim 1 further including an energy level detector.

4. The card as recited in claim 1 wherein the fastening device secures the delay loop fiber to the card.

5. The card as recited in claim 4 further comprising a switch for switching between an amplitude-modulated mode and a phase-modulated mode.

6. The card as recited in claim 1 further including a circuit having a delayed feedback exclusive-or gate.

7. The card as recited in claim 1 wherein the interferometer includes a splitter and a coupler.

8. The card as recited in claim 1 wherein the card includes a backplane made from a printed circuit board.

9. The card as recited in claim 1 wherein the card is a replacement part for an existing optical multiplexor.

10. The card as recited in claim 1 further comprising a switch for switching between an amplitude-modulated mode and a phase-modulated mode.

11. The card as recited in claim 1 wherein interferometer includes a splitter and a coupler, the fastening device contacting the fiber loop between the splitter and the coupler.

12. The card as recited in claim 1 wherein the fastening device includes a spindle.

13. A card for transmitting data over at least one optical fiber, the card comprising:
   a transmitter having at least one light source and a phase modulator for phase modulating light from the source so as to create phase-modulated optical signals in the light as a function of an input electronic data stream; and
   a receiver having an interferometer for reading received optical signals; and a faceplate having a fiber tap signal device for indicating a fiber tap.

14. A card for transmitting data over at least one optical fiber, the card comprising:
   a transmitter having at least one laser and a single phase modulator for phase modulating all of the light from the laser so as to create phase-modulated optical signals in the light as a function of an input electronic data stream;
   a receiver having an interferometer for reading received optical signals; and
   a switch for switching between an amplitude-modulated mode and a phase-modulated mode.

15. The card as recited in claim 14 further comprising a fastening device for securing a delay loop fiber to the card.

16. The card as recited in claim 14 wherein the at least one light is a laser.

17. The card as recited in claim 14 further including an energy level detector.

18. The card as recited in claim 14 wherein the interferometer includes a delay loop fiber.

19. The card as recited in claim 14 wherein the card includes a faceplate having a fiber tap signal device.

* * * * *